1-ACYL-URACIL HERBICIDAL COMPOUNDS

Adolf Zeidler, Ludwigshafen, Hans Kiefer, Wachenheim, Adolf Fischer, Mutterstadt, and Hans-Dieter Hoffmann and Franz Merger, Ludwigshafen, Germany, assignors to Badische Anilin- & Soda-Fabrik Aktiengesellschaft, Ludwigshafen (Rhine), Germany
No Drawing. Filed July 30, 1971, Ser. No. 167,844
Claims priority, application Germany, Aug. 25, 1970,
P 20 41 996.9
Int. Cl. C07d 51/30
U.S. Cl. 260—260    4 Claims

ABSTRACT OF THE DISCLOSURE

Uracil compounds which are substituted in the 1-position by substituted acyl radicals and which have a good herbicidal action.

---

It is known to use substituted uracils, e.g., 3-isopropyl-5-bromo - 6 - methyluracil; 1-acetyl - 3 - isopropyl-5-bromo-6-methyluracil; and 3-cyclohexyl-5,6-trimethyleneuracil, as herbicides. However, their action is not satisfactory.

We have now found that uracils of the formula

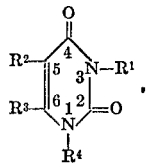

where $R^1$ denotes linear or preferably branched alkyl having 3 to 6 carbon atoms or cycloalkyl having 5 or 6 carbon atoms, $R^2$ denotes halogen (chlorine or bromine), $R^3$ denotes alkyl (preferably methyl) having 1 to 3 carbon atoms, and $R^4$ denotes crotonyl or linear or preferably branched saturated acyl having a maximum of 8 carbon atoms and substituted by 1 to 3 chlorine atoms or a monoacetoxy group, a trichloroacetoxy group or an acyloxy group having 2 to 8 carbon atoms, and where $R^2$ may be linked with $R^3$ by a methylene chain of the formula $(CH_2)_n$, $n$ denoting one of the integers 3, 4 and 5, have an excellent herbicidal action.

The action of the compounds of the invention is particularly in evidence on unwanted, shallow-germinating seed weeds and grassy weeds, and the compounds have good compatibility with the following crops: *Beta vulgaris, Spinacia oleracea* and *Saccharum officinarum*. Application rates are from 0.5 to 10 kg. of active ingredient per hectare. The substances may be applied either pre- or post-emergence. Compared with non-acylated uracils, the new substances have superior crop plant compatibility and a stronger herbicidal action; compared with 1-acetyl-3-alkyl-5-halo-6-alkyluracils, they have far superior crop plant compatibility combined with the same good herbicidal action. Furthermore, the compounds are surprisingly much more easy to formulate in the solvents conventionally used for plant protection agents and are thus considerably easier to apply.

The compounds may be produced by reacting substituted uracils with the appropriate acyl halides in the presence of tertiary amines (triethylamine).

The preparation of the compounds is illustrated below:

EXAMPLE 1

1-chloroacetoxypivaloyl-3-isopropyl-5-bromo-6-methyluracil 241 parts of 3-isopropyl - 5 - bromo - 6 - methyluracil (know from U.S. Pat. 3,235,363) together with 424 parts of chloroacetoxypivalyl chloride in 2,000 parts of toluene are heated at 80° C. over a period of 30 minutes and while stirring, 122 parts of triethylamine which has previously been mixed with 300 parts of toluene is dripped into this solution. The course of the reaction is observed using thin-layer chromatography techniques; the reaction is completed after stirring has been continued for 3 hours. The triethylamine hydrochloride which has formed is filtered off from the hot solution and the filtrate is concentrated in vacuo. After recrystallization of the initially amorphous reaction product from methanol/water and subsequently from benzene, there is obtained 220 parts of the desired product melting at 69° to 70° C. The structure of the compound is confirmed by infrared spectrum, nuclear magnetic resonance spectrum and ultimate analysis.

The remaining active ingredients, examples of which are given below, may be prepared analogously:

1-acetoxypivaloyl-3-isopropyl-5-bromo-6-methyluracil, M.P. 81° to 83° C.;
1-α-methylbutyryl-3-isopropyl-5-bromo-6-methyluracil, M.P. 135° to 136° C.;
1-acetoxypivaloyl-3-isopropyl-5-bromo-6-methyluracil, M.P.: 141° to 142° C.;
1-α-methylbutyryl-3-sec-butyl-5-bromo-6-methyluracil, M.P.: 128° to 132° C.;
1-acetoxypivaloyl-3-cyclohexyl-5,6-trimethyleneuracil, M.P.: 120° to 121° C.;
1-chloroacetoxypivaloyl-3-cyclohexyl-5,6-trimethyleneuracil, M.P.: 126° to 132° C.;
1-pivaloyloxypivaloyl-3-sec-butyl-5,6-tetramethyleneuracil, M.P. 81° C.;
1-bromopivaloyl-3-sec-butyl-5,6-tetramethyleneuracil, B.P. (0.3 mm. Hg): 178° C.;
1-acetoxypivaloyl-3-isopropyl-5,6-tetramethyleneuracil, M.P.: 104° to 106° C.;
1-α-methylbutyryl-3-isopropyl-5,6-trimethyleneuracil;
1-α-methylbutyryl-3-sec-butyl-5,6-trimethyleneuracil;
1-α,α-dimethylbutyryl-3-sec-butyl-5,6-trimethyleneuracil;
1-trichloroacetyl-3-isopropyl-5,6-trimethyleneuracil;
1-trichloroacetoxypivaloyl-3-isopropyl-5,6-trimethyleneuracil;
1-trichloroacetyl-3-cyclohexyl-5,6-trimethyleneuracil;
1-bromopivaloyl-3-cyclohexyl-5,6-trimethyleneuracil;
1-crotonyl-3-cyclohexyl-5,6-trimethyleneuracil.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following examples demonstrate the use of the new active ingredients.

EXAMPLE 2

In a greenhouse, loamy sandy soil was filled into pots and sown with *Saccharum officinarum, Amaranthus retroflexus, Lamium amplexicaule, Poa trivialis, Echinochloa crus-galli* and *Digitaria sanguinalis*. The soil prepared in this manner was then treated with 2 kg. per hectare of each of the following active ingredients, each amount being dispersed in 500 liters of water per hectare:

(I) 1-($\alpha,\alpha$-dimethyl-$\beta$-acetoxypropionyl)-3-isopropyl-5-bromo-6-methyluracil;

(II) 1-($\alpha,\alpha$-dimethyl-$\beta$-chloroacetoxypropionyl)-3-isopropyl-5-bromo-6-methyluracil;

(III) 1-($\alpha$-methylbutyryl)-3-isopropyl-5-bromo-6-methyluracil;

(IV) 1-($\alpha,\alpha$-dimethyl-$\beta$-acetoxypropionyl)-3-cyclohexyl-5,6-trimethyleneuracil;

and, for comparison, (V) 3-isopropyl-5-bromo-6-methyluracil.

After 4 to 5 weeks, I to IV had, compared with V, superior compatibility with *Saccharum officinarum* and a stronger herbicidal action.

|  | Active ingredient | | | | |
|---|---|---|---|---|---|
|  | I | II | III | IV | V |
| Saccharum officinarum | 0 | 0 | 5 | 0 | 25 |
| Amaranthus retroflexus | 100 | 95 | 100 | 95 | 90 |
| Lamium amplexicaule | 100 | 100 | 100 | 95 | 95 |
| POA trivialis | 100 | 100 | 100 | 100 | 95 |
| Echinochloa crus-galli | 100 | 100 | 100 | 100 | 90 |
| Digitaria sanguinalis | 100 | 95 | 100 | 90 | 85 |

Note.—0=No damage; 100=Complete destruction.

The action of the following compounds corresponds to that of I to IV above:

1-bromopivaloyl-3-sec-butyl-5,6-tetramethyleneuracil;
1-acetoxypivaloyl-3-isopropyl-5,6-tetramethyleneuracil;
1-pivaloyloxypivaloyl-3-sec-butyl-5,6-tetramethyeneuracil;
1-(2,2-dimethyl-$\beta$-trichloroacetoxypropionyl)-3-isopropyl-5,6-tetramethyleneuracil;
1-($\alpha,\alpha$-dimethyl-$\beta$-acetoxypropionyl)-3-isopropyl-5,6-trimethyleneuracil;
1-$\alpha$-methylpropionyl-3-isopropyl-5,6-trimethyleneuracil.

EXAMPLE 3

On an agricultural area, the plants *Zea mays, Solanum tuberosum, Poa annua, Poa trivialis, Echinochloa crus-galli, Chenopodium album, Lamium amplexicaule* and *Amaranthus retroflexus* were treated at a growth height of 3 to 11 cm. with 0.5 kg. per hectare of (I) 1-($\alpha,\alpha$-dimethyl-$\beta$-acetoxypropionyl)-3-isopropyl-5-bromo-6-methyluracil and for comparison, with 0.5 kg. per hectare of (II) 1-acetyl-3-isopropyl-5-bromo-6-methyluracil, each active ingredient being dispersed in 500 liters of water per hectare.

After 2 to 3 weeks it was ascertained that I had superior crop plant compatibility to II, combined with the same good herbicidal action.

The results of the experiment are given in the following table:

|  | Active ingredient | |
|---|---|---|
|  | I | II |
| Zea mays | 5 | 25 |
| Solanum tuberosum | 10 | 35 |
| Poa annua | 90 | 90 |
| Poa trivialis | 80 | 75 |
| Echinochloa crus-galli | 80 | 75 |
| Chenopodium album | 90 | 90 |
| Lamium amplexicaule | 80 | 75 |
| Amaranthus retroflexus | 75 | 70 |

Note.—0=No damage; 100=Complete destruction.

EXAMPLE 4

In a greenhouse, loamy sandy soil was filled into pots and sown with *Spinacia oleracea, Beta vulgaris, Lamium amplexicaule, Sinapis arvensis, Chenopodium album, Matricaria chamomilla, Poa annua, Poa trivialis* and *Bromus tectorum*.

The soil prepared in this manner was then treated with 1 kg. per hectare of (I) 1-($\alpha,\alpha$-dimethyl-$\beta$-acetoxypropionyl)-3-cyclohexyl-5,6-trimethyleneuracil and, for comparison, with 1 kg. per hectare of (II) 3-cyclohexyl-5,6-trimethyleneuracil, each active ingredient being dispersed in 500 liters of water per hectare.

After 3 to 4 weeks it was ascertained that I had better compatibility than II with *Spinacia oleracea* and *Beta vulgaris* and a stronger herbicidal action than II on the unwanted plants.

The results of the experiment are given in the following table:

|  | Active ingredient | |
|---|---|---|
|  | I | II |
| Spinacia oleracea | 0 | 10 |
| Beta vulgaris | 0 | 15 |
| Lamium amplexicaule | 100 | 85 |
| Sinapis arvensis | 100 | 90 |
| Chenopodium album | 100 | 90 |
| Matricaria chamomilla | 100 | 85 |
| Poa annua | 95 | 85 |
| Poa trivialis | 95 | 95 |
| Bromus tectorum | 95 | 80 |

Note.—0=No damage; 100=Complete destruction.

EXAMPLE 5

On an outdoor area, *Beta vulgaris, Matricaria chamomilla, Chenopodium album, Lamium amplexicaule, Sinapis arvensis, Poa annua, Poa trivialis* and *Echinochloa crus-galli* were treated at a growth height of 3 to 7 cm. with 1 kg. per hectare of (I) 1-($\alpha,\alpha$-dimethyl-$\beta$-acetoxypropionyl)-3-cyclohexyl-5,6-trimethyleneuracil and, for comparison, with 1 kg. per hectare of (II) 3-cyclohexyl-5,6-trimethyleneuracil, each active ingredient being dispersed in 500 liters of water per hectare.

After 2 to 3 weeks it was ascertained that I had better compatibility with *Beta vulgaris* than II, combined with a superior herbicidal action.

The results of the experiment are given in the following table:

|  | Active ingredient | |
|---|---|---|
|  | I | II |
| Beta vulgaris | 0 | 15 |
| Matricaria chamomilla | 90 | 70 |
| Chenopodium album | 90 | 65 |
| Lamium amplexicaule | 80 | 65 |
| Sinapis arvensis | 95 | 75 |
| Poa annua | 85 | 75 |
| Poa trivialis | 80 | 70 |
| Echinochloa crus-galli | 80 | 65 |

Note.—0=No damage; 100=Complete destruction.

EXAMPLE 6

The plants *Echinochloa crus-galli*, Setaria spp., *Alopecurus myosuroides, Lolium multiflorum*, Vicia spp., Atriplex spp., *Raphanus raphanistrum* and Chrysanthemum spp. were treated at a growth height of 5 to 20 cm. with 5 kg. per hectare of each of the following active ingredients, each amount being dispersed in 500 liters of water per hectare:

1-(α,α-dimethyl-β-acetoxy propionyl)-3-isopropyl-5-bromo-6-methyluracil;
1-(α,α-dimethyl-β-chloroacetoxypropionyl)-3-isopropyl-5-bromo-6-methyluracil;
1-(α-methylbutyryl)-3-isopropyl-5-bromo-6-methyluracil; and
1-(α,α-dimethyl-β-acetoxypropionyl)-3-cyclohexyl-5,6-trimethyleneuracil.

After 3 weeks all the plants were completely withered.

EXAMPLE 7

Fallow land was sown with *Lolium perenne, Poa trivialis, Echinochloa crus-galli, Stellaria media*, Rumex spp. and Polygonum spp. and immediately treated with 5 kg. per hectare of each of the following active ingredients, each amount being dispersed in 500 liters of water per hectare:

1-(α,α-dimethyl-β-acetoxypropionyl)-3-isopropyl-5-bromo-6-methyluracil;
1-(α,α-dimethyl-β-chloroacetoxypropionyl)-3-isopropyl-5-bromo-6-methyluracil;
1-(α-methylbutyryl)-3-isopropyl-5-bromo-6-methyluracil; and
1-(α,α-dimethyl-β-acetoxypropionyl)-3-cyclohexyl-5,6-trimethyleneuracil.

The plants emerged normally, but slowly began to wither. After 5 weeks they were completely withered.

EXAMPLE 8

90 parts by weight of Compond I from Example 2 is mixed with 10 parts by weight of N-methyl-α-pyrrolidone. A mixture is obtained which is suitable for application in the form of very fine drops.

EXAMPLE 9

20 parts by weight of Compound II from Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 10

20 parts by weight of Compound III from Example 2 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 11

20 parts by weight of Compound IV from Example 2 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 12

20 parts by weight of Compound I from Example 2 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 13

3 parts by weight of Compound II from Example 2 is intimately mixed with 97 parts by weight of particulate kaolin. A dust is obtained containing 3% by weight of the active ingredient.

EXAMPLE 14

30 parts by weight of Compound III from Example 2 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. 1-(α,α - dimethyl-β-acetoxypropionyl)-3-isopropyl-5-bromo-6-methyluracil.
2. 1-(α,α - dimethyl - β - chloroacetoxypropionyl)-3-isopropyl-5-bromo-6-methyluracil.
3. 1-(α - methylbutyryl) - 3 - isopropyl-5-bromo-6-methyluracil.
4. 1-(α,α - dimethyl-β-acetoxypropionyl) - 3 - cyclohexyl-5,6-trimethyleneuracil.

References Cited
UNITED STATES PATENTS 3,235,363    2/1966    Luckenbaugh et al. ___ 260—260
3,360,520    12/1967    Luckenbaugh et al. ___ 260—260

DONALD G. DAUS, Primary Examiner

A. M. T. TIGHE, Assistant Examiner

U.S. Cl. X.R.

71—92